US011672244B2

(12) United States Patent
Rose et al.

(10) Patent No.: US 11,672,244 B2
(45) Date of Patent: Jun. 13, 2023

(54) INSECT BARRIER ARRANGEMENT UTILIZING ELECTRODES

(71) Applicants: Biogents AG, Regensburg (DE); Agencia Consejo Superior de Investigaciones Científicas (CSIC), Madrid (ES); Instituto de Salud Global Barcelona (ISGlobal), Barcelona (ES)

(72) Inventors: Andreas Rose, Regensburg (DE); Farooq Tanveer, Regensburg (DE); Elies Molins, Barcelona (ES); Krijn Paaijmans, Tempe, AZ (US); Berta Domènech Garcia, Regensburg (DE)

(73) Assignees: Biogents AG, Regensburg (DE); Agencia Consejo Superior de Investigaciones Científicas (CSIC), Madrid (ES); Instituto de Salud Global Barcelona (ISGlobal), Barcelona (ES)

( * ) Notice: Subject to any disclaimer, the term of this patent is extended or adjusted under 35 U.S.C. 154(b) by 255 days.

(21) Appl. No.: 16/753,874

(22) PCT Filed: Oct. 18, 2018

(86) PCT No.: PCT/EP2018/078649
§ 371 (c)(1),
(2) Date: Apr. 6, 2020

(87) PCT Pub. No.: WO2019/077084
PCT Pub. Date: Apr. 25, 2019

(65) Prior Publication Data
US 2020/0260717 A1  Aug. 20, 2020

(30) Foreign Application Priority Data

Oct. 20, 2017  (DE) .................... 10 2017 124 508.1
Dec. 19, 2017  (EP) ..................................... 17208300

(51) Int. Cl.
*A01M 29/28* (2011.01)
*A01M 1/22* (2006.01)
*A01M 29/34* (2011.01)

(52) U.S. Cl.
CPC ............ *A01M 29/28* (2013.01); *A01M 1/226* (2013.01); *A01M 29/34* (2013.01)

(58) Field of Classification Search
CPC .............................. A01M 29/28; A01M 1/226
See application file for complete search history.

(56) References Cited

U.S. PATENT DOCUMENTS 4,969,418 A * 11/1990 Jones ...................... A01K 3/002
119/908
5,775,261 A * 7/1998 Shaw .................... A01M 1/223
119/482
(Continued)

FOREIGN PATENT DOCUMENTS

WO  9944418 A1  9/1999
WO  2012086253 A1  6/2012
WO  2014024052 A1  2/2014

OTHER PUBLICATIONS

PCT/EP2018/078649—Filed Oct. 18, 2018—International Search Report and Written Opinion dated Dec. 17, 2018.
(Continued)

*Primary Examiner* — Jessica B Wong
(74) *Attorney, Agent, or Firm* — Simmons Perrine Moyer Bergman PLC (57) ABSTRACT

Disclosed is an insect repulsion and/or barrier system (10) and a method for repelling insects (2) and/or for preventing insects (2) from passing through a defined opening (12) or surface (9). The barrier system (10) is equipped with devices (16) for preventing insects from passing through an opening (12) or for repelling insects when approaching the opening (12) and/or the devices (16). The devices (16) have at least
(Continued)

two electrodes (18), whereby different electrical potentials are applied to or can be applied to the at least two electrodes (18). The at least two electrodes (18) are arranged within or on the edge of or outside the opening such that an electrical field (28) is formed between the at least two electrodes (18). The electrical field (28) rejects and/or repels insects approaching the electrical field (28) or prevents insects approaching the electrical field (28) from passing through the opening (12).

14 Claims, 5 Drawing Sheets

(56) References Cited

U.S. PATENT DOCUMENTS

| | | | |
|---|---|---|---|
| 5,926,614 A * | 7/1999 | Steinel | A61L 9/03 439/13 |
| 2006/0024195 A1* | 2/2006 | Lagunas-Solar | A61L 2/087 422/21 |
| 2016/0324139 A1* | 11/2016 | Carstensen | A01M 29/24 |

OTHER PUBLICATIONS

PCT/EP2018/078649—Filed Oct. 18, 2018—International Preliminary Reporton Patentability dated Apr. 21, 2020.

\* cited by examiner

INSECT BARRIER ARRANGEMENT UTILIZING ELECTRODES

CLAIM OF PRIORITY

The present application claims priority to International Application PCT/EP2018/078649, filed on Oct. 18, 2018, which in turn claims priority to German Application 10 2017 124 508.1, filed Oct. 20, 2017, which are incorporated by reference.

FIELD OF THE INVENTION

This invention concerns an insect repulsion and/or barrier arrangement, and a method for repelling insects and/or for preventing insects from passing through a defined opening or surface.

BACKGROUND OF THE INVENTION

In order to prevent insects or other vermin from passing through a largely air-permeable opening in a wall or a surface, in particular insects attracted by human odours, such as flying insects and/or insect pests, in particular mosquitoes, sand flies, biting midges, black flies, other flies, etc., such openings are often provided with so-called fly screens, frames or doors which may be equipped with fine-meshed polyester or nylon meshes. The openings mentioned can be room windows or doors, for example, which can be opened or closed. Likewise, it can also be permanent openings in walls such as ventilation shafts or slots, for example. In many cases, fly protection devices prevent insects from passing through the opening equipped with the fly protection device and thus provide protection against insects. The smaller the mesh size of the fly protection device, the higher the protection against small insects. Often, however, the small mesh size is not sufficient to prevent insects from passing through the opening.

For example, WO 99/44418 A1 shows a method and a device for repelling insects from a predefined space by generating an electric field between the insects and the boundary of the predefined space. For this purpose, a mesh grid is provided as a spatial boundary, on which mesh grid an electrode connected to a voltage source is attached. By the electrode, an electrical potential can be applied to the mesh grid. Insects approaching the grid should be repelled by the electric field. However, since the grid has a low electrical conductivity, the voltage applied to the grid via the electrode decreases with increasing distance to the electrode. Another disadvantage of the process and the device according to WO 99/44418 A1 is that the small mesh size impairs the air exchange within the space covered by the mesh, thus severely disturbing the air circulation.

SUMMARY OF THE INVENTION

Therefore, one of the primary aims of the present invention can be considered to provide a simple insect repulsion and/or barrier arrangement (also called a barrier system) which is highly effective in preventing the passing of insects through a designated opening, and/or providing a possibility to repel insects when approaching the opening. In addition, the above-mentioned insect repulsion and/or barrier arrangement should allow sufficient air exchange and/or good air circulation through the opening. In addition, an improved method of repelling insects and/or preventing the passage of insects through a defined opening or surface is to be provided, which prevents the passage of insects or allows the repelling of insects.

This objective is achieved by an insect repulsion and/or barrier arrangement with the characteristics of the respective independent claims. Similarly, the aforementioned objective is achieved by a method for repelling insects and/or preventing the passage of insects through a defined opening or surface in accordance with the independent method claim. Characteristics of advantageous further embodiments of the invention can be found in the dependent claims.

In order to achieve this goal, the invention proposes an insect repulsion and/or barrier arrangement with at least one opening within a wall or surface, which is largely permeable to ambient air. The insect repulsion and/or barrier arrangement shall be equipped or provided with devices for preventing insects from passing through the opening and/or repelling insects when approaching the opening and/or the devices and/or preventing the insects from approaching the opening and/or the devices. The devices comprise at least two electrodes, whereby different electrical potentials are applied to or can be applied to the electrodes. The two electrodes are arranged within the opening and/or on the edge of the opening and/or outside of the opening and in proximity to the opening at a definable distance from each other. The at least two electrodes are arranged in such a way that an electrical field is formed between the at least two electrodes in such a way that a permanent electrical field or a cyclically increasing and decreasing electrical field or an electrical field present at intervals with interruptions is generated. The permanent electrical field or the cyclically increasing and decreasing electrical field or the electrical field present at time intervals with interruptions, repels the insects approaching the electric field and/or prevents the insects from passing through the opening.

For example, the opening of the insect repulsion and/or barrier arrangement can be a room window to be opened or closed or a room door, which can be located, for example, in the wall of a residential building or an industrial building. In addition, it is also conceivable to equip an always open opening within a wall of a building, such as a ventilation shaft or a ventilation slot, with an insect repulsion and/or barrier arrangement according to the invention.

Furthermore, the invention proposes an insect repulsion and/or barrier arrangement positioned within a defined surface or environment, which has at least one framework that at least partially spans the surface or environment and is largely permeable to ambient air. The framework is also equipped with devices, the devices preventing insects from passing through and/or repelling insects when approaching the framework and/or devices. The devices comprise at least two electrodes, whereby different electrical potentials are applied to or can be applied to the electrodes. The two electrodes are arranged within the framework and/or on the edge of the framework and/or outside of the framework and in proximity to the framework at a definable distance from each other. The at least two electrodes are arranged in such a way that an electrical field is formed between the at least two electrodes in such a way that a permanent electrical field or a cyclically increasing and decreasing electrical field or an electrical field present at intervals with interruptions is generated. The permanent electrical field or the cyclically increasing and decreasing electrical field or the electrical field present at time intervals with interruptions repels the insects approaching the electric field and/or prevents insects approaching the electrical field from passing through the surface spanned or covered by the framework.

Such an insect repulsion and/or barrier arrangement is particularly suitable, for example, for indoor seating areas, outdoor seating areas, sleeping areas or working areas or the like. The surroundings of the sitting areas, sleeping areas or working areas can be shielded by the electric field provided by the insect repulsion and/or barrier arrangement, so that the people in the above-mentioned areas can be protected from insects, in particular, from mosquitoes or the like. Particularly, insects are attracted by the odours of humans present within the areas, so that the unwanted insects often accumulate in large numbers. The insect repulsion and/or barrier arrangement according to the invention can also be suitable, for example, for animal stables or the like, in order to create insect-free areas for the animals and thus protect them in particular from possible diseases transmitted by insects.

In a preferred embodiment of the respective insect repulsion and/or barrier arrangement according to the invention, the electric field can have a value or strength which is less than 1 kV/cm or equal to 1 kV/cm or greater than 1 kV/cm. Electric fields with a value in the range of 1 kV/cm are particularly suitable for rejecting insects in the form of flying insects and/or insect pests, in particular mosquitoes, and/or preventing the insects from passing through openings or surfaces protected by a framework. A value in the range of 1 kV/cm is particularly suitable for the insect repulsion and/or barrier arrangement according to the invention, as mosquitoes or similar insects are not killed or injured by such an electrical field, but are simply repelled. The electric field thus forms an impenetrable barrier for the respective insects.

The electrical potential applied to the at least two electrodes is preferably in the order of magnitude of at least 2 kV, but particularly in the order of magnitude of more than 3 kV. Tests have shown that particularly, an electrical potential applied to the at least two electrodes can lie within a range of about 3.5 kV in order to achieve ideal results.

It is known that insects themselves have a charged surface. The charge is especially generated during their flight by friction. Because of this charge, the insects are repelled from the electrical field that is generated between the at least two electrodes of the insect repulsion and/or barrier arrangement.

Different shapes can be suitable for the at least two electrodes. Thus, the at least two electrodes can each be formed by elongated electrical conductors, particularly by metallic or electrically conductive wires with a small cross-section compared to their length. Alternatively, it is also conceivable to form the at least two electrodes by elongated electrical conductors particularly by metallic or electrically conductive flat pieces with a small thickness compared to their length and with a several times larger width compared to their small thickness.

Particularly, it may be provided that the at least two elongated electrical conductors, respectively forming the electrodes, each show a substantially elongated course. Thereby, the at least two electrical conductors can extend approximately parallel to each other over their longitudinal extension.

Furthermore, the opening or the framework may be equipped and/or spanned with two or more elongated electrical conductors, each of which forming an electrode, whereby the two or more electrical conductors are each approximately parallel to each other and/or whereby the electrical conductors are formed by flat pieces arranged in such a way that their flat sides are facing each other. Adjacent electrodes or adjacent elongated electrical conductors preferably have different electrical potentials, so that a similar and/or uniform and/or constant electric field can be formed between each pair of adjacent electrodes.

Furthermore, it is conceivable that the opening or the framework may be equipped and/or spanned with a plurality of long electrical conductors, each conductor forming an electrode, each of which is arranged approximately equidistantly and parallel to one another. Thereby a similar and/or uniform and/or constant electrical field can be formed between each pair of adjacent electrodes.

Preferably, the respective distance between the at least two electrodes should be less than 2 cm or equal to 2 cm or greater than 2 cm. Using such a distance between the at least two electrodes and applying an electric field of at least 3.5 kV to the electrodes can result in an optimal electric field for insect repulsion of the insect repulsion and/or barrier arrangement. In some cases, the at least two electrodes can be arranged, for example, at a distance of more than 2 cm or a distance of less than 2 cm from each other. In order to create an electric field with a strength suitable for insect repulsion, it may be necessary to adapt the electrical potential that is applied to the at least two electrodes. If the electrical field is too weak, the created barrier is not sufficiently impenetrable and insects may penetrate the electrical field. The same applies when selecting a voltage value higher or lower than 3.5 kV. In this case, it may be necessary to adjust the distance between the at least two electrodes. The correct choice of distances between the at least two electrodes and the correct choice of values of the electrical potentials applied to the at least two electrodes can also prevent the formation of an excessively strong electrical field. A strong electric field with a value that is too high may kill or injure insects, which is to be largely avoided by the present invention. It may be necessary to adjust the strength of the electric field regarding the type of insects to be repelled. Therefore, it is possible to universally use such insect repulsion and/or barrier arrangement in different surroundings, in each case adapting it to the special requirements of the respective surrounding, for example to the kind of insects that are predominant in that relevant surrounding.

A blind can be used, for example, as a basis for a device of the insect repulsion and/or barrier arrangement according to the invention, the device preventing the passage of insects through an opening and/or repelling the insects when approaching the opening and/or the device. Blinds usually comprise a plurality of lamellae spread evenly over the surface of an opening. In principle, the lamellae can be formed by flat pieces having a thickness that is several times smaller than the length of the lamellae and having a thickness that is several times smaller than their width. Hereby, the lamellae formed by flat pieces can approximately point towards each other with their flat sides. Usually blinds are used as privacy protection and sun protection as well as weather protection at room windows or doors. The individual lamellae of the blinds can be made, for example, of aluminium or another electrically conductive metal. As a result, the lamellae can each form an elongated electrical conductor. In some cases, plastic, glass or wood can also be used as suitable material for the lamellae, which can then be provided with a suitable electrically conductive coating. For example, depending on the respective requirements, the lamellae can have a length ranging from a few centimetres to 2 m or more metres. The width of the lamellae can also be selected according to the respective requirements. For example, widths between 10 millimetres and 100 millimetres are suitable. In some cases, the lamellae may also have a width greater than 100 millimetres. Depending on the design or material of the lamellae, the thickness of the individual lamellae can range, for example, from 0.15 millimetres to 3.0 millimetres. Conventional aluminium lamellae usually have a thickness around 0.2 millimetres, whereas wooden lamellae have a thickness of up to 3 millimetres.

Furthermore, the lamellae can also be designed as fixed, rotatable or otherwise adjustable or movable. If the lamellae are adjustable or movable lamellae, the blinds can each contain a buffer for the lamellae in order to be able to remove the lamellae temporarily from the opening, if necessary. The lamellae can be electrically and/or manually adjustable and/or movable. Adjustable or movable lamellae can be used particularly to regulate the lighting and ventilation of the room behind the blinds. For example, the lamellae can be arranged in a distance between 1 cm to 3 cm, preferably in a distance about 2 cm from each other, and can extend approximately parallel to each other over their longitudinal extension.

By suitable connecting devices to a voltage source, the lamellae or electrodes can be supplied with an appropriate electrical voltage, so that a similar and/or uniform and/or constant electric field can be formed between each pair of adjacent electrodes or lamellae. This results in an alternating arrangement of lamellae or electrodes with a positive potential as well as lamellae or electrodes with a negative potential. By supplying the electrodes or the individual lamellae being made of electrically conductive material with electrical voltage positive or negative electrical potentials are formed and the electrical field can form or build up. The electric field can repel insects approaching the electric field and/or prevent the insects from passing through the opening.

In principle, blinds whose lamellae are coated with paint, for example for optical reasons, can also be used for the insect repulsion and/or barrier arrangement. To a certain extend the colour forms an insulation layer around the electrical conductors formed by the lamellae, so that only a weaker electrical field can form, which may not suffice as a barrier for the insects in some cases. In order to nevertheless provide reliable protection against undesirable insects, for example, the electrical voltage or electrical potential that is to be applied to the electrical conductors or lamellae can be increased, so that the increased electrical potential on the electrodes or lamellae result in a sufficiently strong electrical field.

A suitable area of application for an insect repulsion and/or barrier arrangement according to the invention can be found in residential buildings or stable buildings, in particular, such buildings being built in African countries or other tropical or subtropical regions. Such buildings are often equipped with openings, so-called open eaves, to allow ventilation of the interior of the building or sufficient air circulation between the surrounding environment and the interior of the building. Such open eaves particularly, however, also offer an opportunity for insects such as the above-mentioned flying insects and/or pest insects, particularly mosquitoes, sand flies, biting midges, black flies, other flies, etc., which insects are attracted particularly by human odours or other attractants, to enter the interior of the building.

In this case too, the insect repulsion and/or barrier arrangement may provide devices for preventing the passage of insects and/or for the repulsion of insects when approaching the opening or the open eaves and/or the respective devices of the insect repulsion and/or barrier arrangement. The devices can comprise at least two electrodes, whereby different electrical potentials are applied to or can be applied to the electrodes. The at least two electrodes can each be formed by elongated electrical conductors, particularly by metallic or electrically conductive wires with a small cross-section compared to their length. The above-mentioned wires can be stretched crosswise from one end of the open eaves to the other end. In this case too, for example, a distance between the wires ranging from 1 cm to 3 cm, preferably a distance of 2 cm between the wires, can be suitable. In addition, the wires can ideally extend approximately parallel to each other over their longitudinal extension. For some embodiments the use of elongated electrical conductors or wires installed in a grid or net-like manner within a surface of the opening can also be suitable Preferably, the wires charged with electrical voltage are arranged in such a distance apart from each other that a suitable permanent electrical field or a suitable cyclically increasing and decreasing electrical field or an electrical field being present in time intervals with interruptions can be formed.

The electrically conductive wires or the electrodes can be alternately charged with different electrical potentials, e.g. negative and positive electrical potential. By suitable connector to a voltage source, the wires or electrodes can be supplied with suitable electrical voltage, so that a similar and/or uniform and/or constant electric field can form between each pair of adjacent wires or electrodes. This can also result in an alternating arrangement of wires or electrodes with a positive potential and wires or electrodes with a negative potential. By supplying the electrodes or individual wires with electrical voltage positive or negative electrical potentials are produced, thereby generating the desired electric field. Insects approaching the electric field are repelled and/or rejected by the electric field and/or prevented from passing through the opening or the open eaves.

Furthermore, insect repulsion and/or barrier arrangements according to the invention can also be positioned within defined surfaces or environments, whereby at least one framework can be used, which at least partially spans the surface or the environment and is largely permeable to ambient air. These insect repulsion and/or barrier arrangements are particularly suitable for use in sitting areas, sleeping areas or working areas described above. The framework is equipped with devices for preventing the passage of insects through the framework and/or for repelling insects when approaching the framework and/or the devices, the devices comprising at least two electrodes, whereby different electrical potentials are applied to or can be applied to the electrodes. The framework may preferentially be equipped and/or spanned with a plurality of long electrical conductors forming the electrodes, the conductors being arranged approximately equidistantly and parallel to one another. Thereby a similar and/or uniform and/or constant electrical field can be formed between each pair of adjacent electrodes. For this purpose, metallic or electrically conductive wires with a small cross-section compared to their length are also suitable. The wires or other elongated electrical conductors can be arranged in a grid or net-like manner, thereby having for example a distance of 1 cm to 3 cm, preferably having a distance of 2 cm between each other. The elongated electrical conductors arranged in a grid or net-like manner can have a total length of several meters.

The electrodes, which are arranged within and/or at the edge and/or outside of the framework and in proximity to the framework at a definable distance from each other, can comprise, as already mentioned, at least two electrodes, whereby different electrical potentials can be applied to the at least two electrodes, whereby an electrical field can form between the electrodes which rejects and/or repels insects approaching the electrical field. In addition, the electric field can also prevent insects from passing through the surface or environment spanned or covered by the framework.

In order to generate the electrical field, the electrodes or conductors can be supplied with appropriate electrical voltage via suitable connecting devices to a voltage source, so that a similar electrical field can form between each pair of adjacent electrodes or conductors. The electrical field can be formed by an alternating arrangement of conductors or electrodes with positive potential and conductors or electrodes with negative potential. The electric field of the respective insect repulsion and/or barrier arrangement can keep the protected seating areas, sleeping areas or work areas free from insects.

In preferred embodiments of the insect repulsion and/or barrier arrangement according to the invention, the electrical potential applied to at least two electrodes is formed over the course of time approximately constant or intermittent or pulsating and/or increasing and decreasing, especially up swelling and down swelling.

As already mentioned several times, it is conceivable that the electrical potential applied to the at least two electrodes is formed by positive and negative voltages of at least one voltage source. Alternatively, the electrical potential applied to at least two electrodes can be formed by a positive potential and a grounding. Optionally, it is also possible to form the electrical potential applied to or applicable to the at least two electrodes by a negative potential and a grounding.

The invention also includes a method of repelling insects and/or preventing insects from passing through a defined opening or surface, the opening or surface being largely permeable to ambient air. The method prevents the passage of insects and/or allows the repulsion of the insects while approaching the opening and/or the surface by an electric field generated by at least two electrodes, whereby different electrical potentials are applied to or applicable to the at least two electrodes. The at least two electrodes are arranged within and/or on the edge and/or outside of the opening or the surface and in proximity to the opening or the surface in a definable distance from each other, so that a permanent electrical field or a cyclical increasing and decreasing electrical field is formed between the at least two electrodes. The electric field rejects and/or repels insects approaching the electric field and/or prevents them from passing through the opening or surface. The method in accordance with the invention may be carried out or be feasible with an insect repulsion and/or barrier arrangement as described above.

In order to increase the safety as well as to protect persons who could possibly come into contact with the insect repulsion and/or barrier arrangement, for example persons being in charge of handling or maintenance of the insect repulsion and/or barrier arrangement, it is also possible to arrange a contact protector or touch protection device in the vicinity of the insect repulsion and/or barrier arrangement or to integrate a contact protector or touch protection device into the insect repulsion and/or barrier arrangement. This touch protection device can, for example, be formed by one resistor or by several resistors. Such resistors can, for example, be positioned in the region of the at least two electrodes or directly at the at least two electrodes. As already described, different electrical potential is applied or can be applied to the at least two electrodes in such a way that a cyclically increasing and decreasing electrical field is formed between the at least two electrodes or an electrical field present at intervals with interruptions is generated between the at least two electrodes, wherein the electrical field is limited by the resistor(s).

The contact protector or touch protection device comprising the resistor or resistors can prevent a current flow from the at least two electrodes which are charged or can be charged with different electrical potentials to a person touching the electrode or electrodes or to a person close to the electrode or electrodes, thereby protecting the person from an injury caused by the current flow. However, the insect repellent and/or barrier arrangement is still able to prevent insects from passing through the protected opening or passing through the protected surface or environment or to repel the insects, since still a permanent or cyclical increasing and decreasing electrical field of sufficient strength can be formed between the at least two electrodes or still an electrical field being present in time intervals with interruptions can be formed between the at least two electrodes which are present, wherein the at least two electrodes are or can be charged with different electrical potential.

By adding a contact protector or touch protection device, it is also possible to apply very high electrical potentials to the at least two electrodes. It is even possible to increase the distances between the at least two electrodes without impairing the function of the insect repulsion and/or barrier arrangement and still rejecting insects approaching the electric field and/or preventing the insects from passing through the opening or the surface or the environment protected by the insect repulsion and/or barrier arrangement.

It is to be expressly mentioned here once again that all aspects and embodiments which have been explained in relation with the insect repulsion and/or barrier arrangement according to the invention equally concern or can be partial aspects of the method for repelling insects and/or preventing the passing of insects through a defined opening or surface. Therefore, if certain aspects and/or contexts and/or effects are described at one point in the description or also in the definition of claims of the insect repulsion and/or barrier arrangement according to the invention, this equally applies to the method according to the invention. Conversely, the same applies, so that all aspects and embodiments which have been explained relating to the method according to the invention are or may be equally affected by partial aspects of the insect repulsion and/or barrier arrangement according to the invention. Therefore, if there is a reference to certain aspects and/or interrelationships and/or effects at one point in the description or also in the definition of claims relating to the method according to the invention, this equally applies to the insect repulsion and/or barrier arrangement in accordance with the invention.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

The same or equivalent elements of the invention are designated by identical reference characters. Furthermore, and for the sake of clarity, only the reference characters relevant for describing the respective figure are provided. It should be understood, that the embodiments described are only examples of how the insect repulsion and/or barrier arrangement and the method according to the invention may be executed. These examples are not intended to limit the scope of the disclosure.

DETAILED DESCRIPTION OF THE INVENTION

Figure 1A:
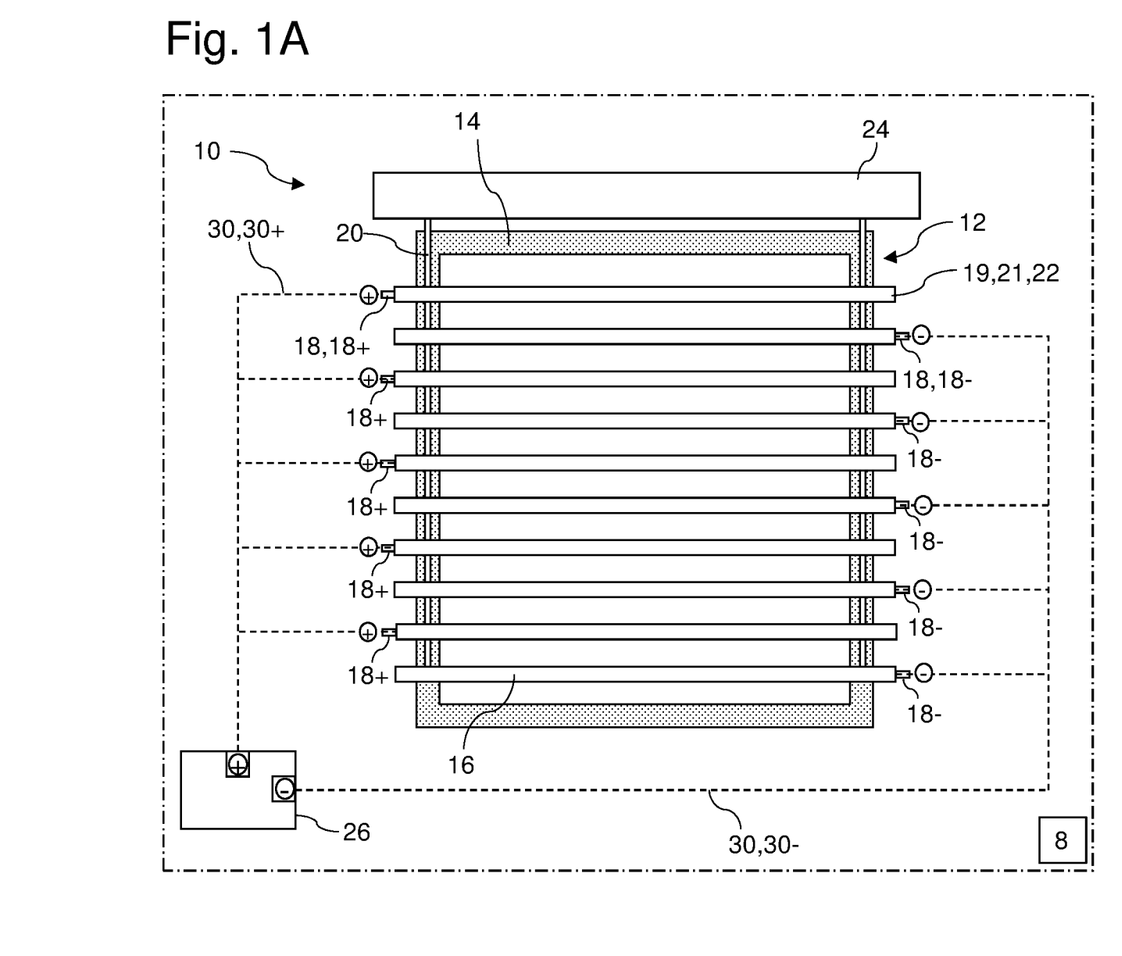
FIG. 1A shows a schematic representation of an embodiment of the insect repulsion and/or barrier arrangement according to the invention.
Figure 1B:
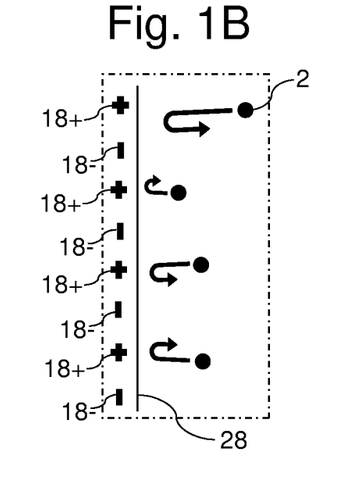
FIG. 1B shows a schematic side view of the insect repulsion and/or barrier arrangement according to the invention.

The schematic representation of the FIGS. 1A and 1B show one embodiment of the insect repulsion and/or barrier arrangement (or barrier system) 10 according to the invention, which can be used to prevent the passage of insects 2 through an opening 12 and/or which can be used to repel insects 2 from approaching an opening 12. The invention is especially used as protection against flying insects and/or insect pests, such as mosquitoes, sand flies, biting midges, black flies, other flies, etc. Often, such insects 2 try to pass through openings 12 when detecting human odours or other attractants.

The insect repulsion and/or barrier arrangement 10 schematic depicted in FIG. 1A contains at least one opening 12 located within a wall 8 or a surface 9, which is largely permeable to ambient air. In the embodiment of the insect repulsion and/or barrier arrangement 1 shown in FIG. 1A, the opening 12 is a room window 14 which can be opened or closed, or a room door which can be located within the wall 8 of a residential building or an industrial building. In addition, it is also conceivable to equip an always open opening 12 within a wall 8 of a building, such as a ventilation shaft or a ventilation slot, with an insect repulsion and/or barrier arrangement 10 according to the invention. Furthermore, the insect repulsion and/or barrier arrangement 10 provides devices 16 preventing the passage of insects 2 through the opening (see FIG. 1B) and/or repelling the insects 2 when approaching the opening 12 and/or the devices 16.

In this example, a blind 20 serves as the basis for the above-mentioned devices 16. The blind 20 comprises a plurality of lamellae 22 which are evenly distributed and extend over the surface of opening 12. Usually, blinds 20 are used as privacy protection and sun protection as well as weather protection on room windows 14 or room doors. The individual lamellae 22 of the blind 20 can be made, for example, of aluminium or another electrically conductive metal. As a result, the lamellae 22 can each form elongated electrical conductors 19. In some cases, plastic, glass or wood can also be suitable for the lamellae 22, which can then be provided with a suitable electrically conductive coating. In principle, the lamellae 22 can be formed by flat pieces 21 with several times larger length compared to their widths and several times larger width compared to their small thickness. In this case, the lamellae 22 formed by flat pieces 21 can respectively point approximately towards each other with their flat sides.

Furthermore, the lamellae 22 can also be designed as fixed, rotatable or otherwise adjustable or movable. If the lamellae 22 are adjustable or movable lamellae 22, the blind 20 can include a buffer 24 for the lamellae 22 in order to be able to temporarily remove the lamellae 22 from opening 12, if necessary. The lamellae 22 can be electrically and/or manually adjustable or movable. Adjustable or movable lamellae 22 can particularly be used to control the lighting and ventilation of the room behind the blind 20. For example, the lamellae 22 can be arranged at distances of 1 cm to 3 cm, preferably 2 cm from each other, and their show a longitudinal extension that is approximately parallel to each other. This enables sufficient ventilation and air circulation of the room behind the opening 12, even when the blinds 22 covering the opening 12 are closed.

In accordance with the invention, the devices 16 comprise at least two electrodes 18, whereby different electrical potentials are applied to or can be applied to the at least two electrodes 18, whereby the at least two electrodes 18 are arranged within and/or on the edge and/or outside the opening 12 and in close proximity to the opening 12 in a definable distance from each other. In the present embodiment, the electrically conductive lamellae 22 can form the electrodes 18, which are alternately applied to with different electrical potentials, such as negative and positive electrical potential. The electrodes 18 and/or the lamellae 22 can be supplied with appropriate electrical voltage by suitable connecting devices, so that a similar and/or uniform and/or constant electrical field 28 is formed between each pair of adjacent electrodes 18 and/or lamellae 22 (see FIG. 1B). Voltage values which provide an electrical potential of at least 2 kV, particularly more than 3 kV, to the electrodes 18 and 22 are particularly suitable for this purpose. Values in a range of 3.5 kV also provide optimal results.

This results in an alternating arrangement of lamellae 22 or electrodes 18+ with a positive potential and lamellae 22 or electrodes 18− with a negative potential. The lamellae 22 and electrodes 18 can be supplied with electrical voltage via a device 26 providing electrical voltage. For this purpose, the electrodes 18+, 18− are connected via suitable connecting devices 30 or 30+, 30− to the device 26 providing electrical voltage. Preferably, the lamellae 22 applied with electrical voltage are spaced relative to each other in such a way that a suitable permanent electrical field 28 or a suitable cyclically increasing and decreasing electrical field 28 or an electrical field 28 present at time intervals with interruptions can be formed. Besides the already described electrodes 18, which are applied to with positive and negative electrical potentials, electrodes 18 are also suitable, where the electrical potential is generated by a positive potential and a grounding or by a negative potential and a grounding.

The supply of electrical voltage to the electrodes 18+, 18− or to the individual lamellae 22 made of electrically conductive material and the resulting positive or negative electrical potentials can result in the formation or build-up of an electrical field 28. In principle, the electrical potential applied to electrodes 18 and lamellae 22 can over time be approximately constant or intermittent or pulsating and/or increasing and decreasing, especially up swelling and down swelling. The electrical field 28 may be able to reject and/or repel insects 2 from the opening 12 and/or prevent insects 2 approaching the electrical field 28 from passing through opening 12. This effect is shown in the FIG. 1B. An electrical field 28 generating a value of less than or equal to or greater than 1 kV/cm is particularly suitable for rejecting insects 2 in the form of flying insects and/or pest insects, particularly mosquitoes, and/or preventing the insects 2 from passing through the opening 12. A value in the range of 1 kV/cm is particularly suitable for the insect repulsion and/or barrier arrangement 10, as mosquitoes, for example, are not killed or injured by such an electrical field 28, but merely repelled. The electrical field 28 thus forms a preferably impenetrable barrier for the respective insects 2.

Figure 2:
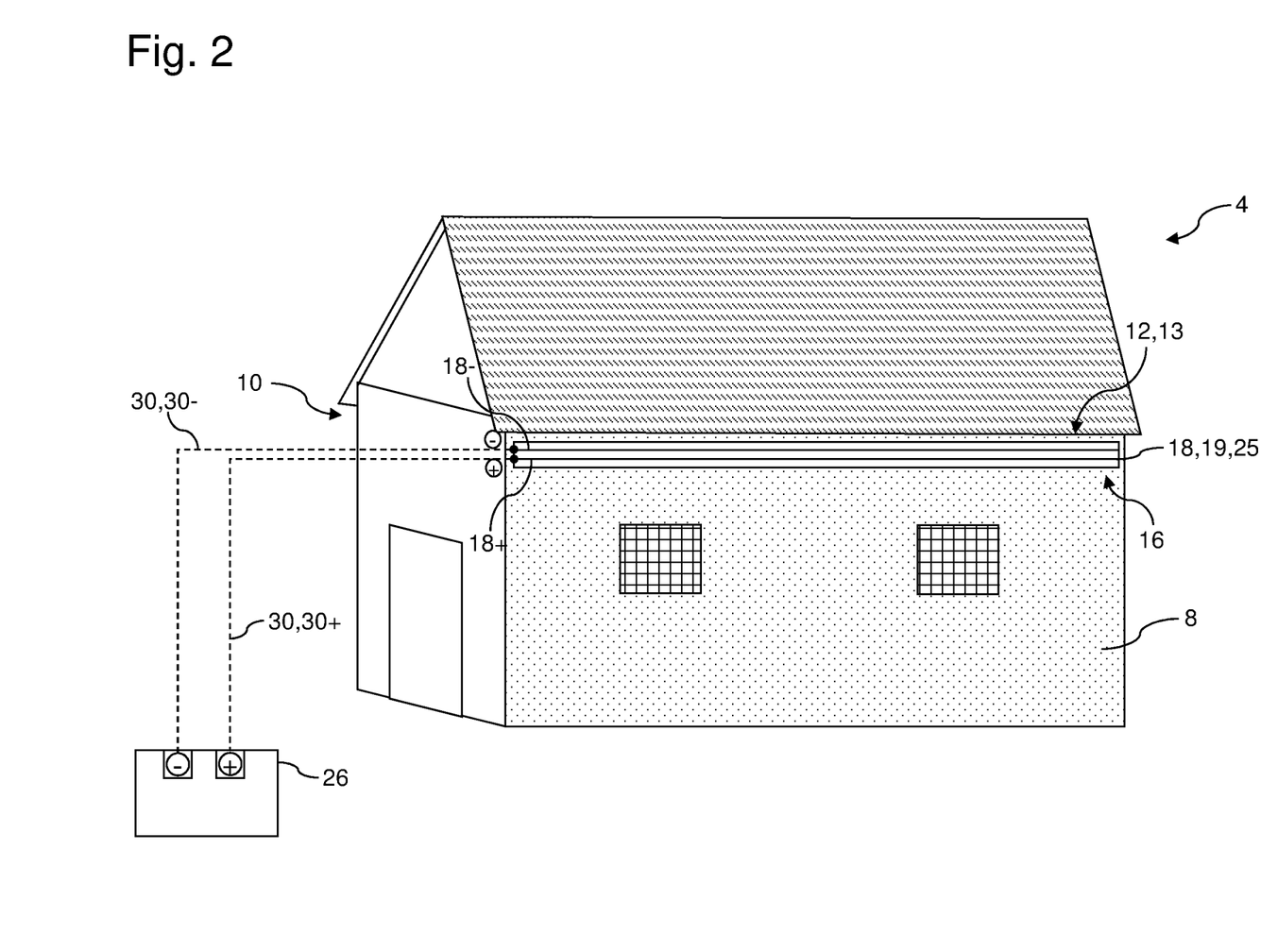
FIG. 2 shows a schematic representation of another embodiment of the insect repulsion and/or barrier arrangement according to the invention.

The insect repulsion and/or barrier arrangement 10 according to FIG. 2 uses a similar approach as the insect repulsion and/or barrier order 10 according to FIG. 1A. Particularly in African countries or other tropical or subtropical regions, residential buildings or stable buildings 4 are often equipped with openings 12, especially with so-called open eaves 13, in order to allow ventilation of the interior of the building or sufficient air circulation between the environment and the interior of the building. These open eaves 13, for example, are arranged in a transition area between the building wall and the roof. However, such open eaves 13 particularly offer an opportunity for insects 2 such as the aforementioned flying insects and/or pest insects, especially mosquitoes, sand flies, biting midges, black flies, other flies, etc. attracted by human odours or other attractants, to penetrate into the interior of the building.

The insect repulsion and/or barrier arrangement 10 according to FIG. 2 also contains an opening 12 within a wall 8 or a surface 9 in the form of an open eave 13, which is largely permeable to ambient air. Furthermore, the insect repulsion and/or barrier arrangement 10 also provides for devices 16 preventing insects 2 from passing through the opening 12 and/or from passing through the open eave 13 (see again FIG. 1B) and/or repelling the insects 2 when approaching the opening 12 and/or the open eave 13 and/or the devices 16. The devices 16 comprise at least two electrodes 18 whereby different electrical potentials are applied to or can be applied to the at least two electrodes 18. Electrodes 16 are each formed by elongated electrical conductors 19, in particular by metallic or electrically conductive wires 25 with a small cross-section compared to their length. The above-mentioned wires 25 can be stretched crosswise from one end of the open eaves 13 to the other end. In this case a distance between the wires 25 ranging, for example, from 1 cm to 3 cm, preferably a distance of 2 cm, can be suitable. In addition, the wires 25 run almost parallel to each other along their longitudinal extension. In FIG. 2, only two individual wires 25 are shown, but it is also conceivable to arrange more than two wires 25 in the area of the open eave 13.

Again, the devices 16 comprise at least two electrodes 18, whereby different electrical potentials are applied to or can be applied to the at least two electrodes 18, which electrodes 18 are arranged within and/or on the edge and/or outside the opening 12 and in close proximity to the opening 12 at a definable distance from each other. As already mentioned, in the presented embodiment the electrical conductive wires 25 can form electrodes 18, whereby different electrical potentials, for example negative and positive electrical potential, are applied to the electrodes 18 alternately. By suitable connecting devices, electrodes 18 and/or wires 25 can be supplied with suitable electrical voltage, so that a similar and/or uniform and/or constant electrical field 28 is formed between each pair of adjacent electrodes 18 and/or wires 25 (see FIG. 1B). Voltage values which apply an electrical potential of at least 2 kV, particularly more than 3 kV, on the electrodes 18 and/or wires 25 are particularly suitable for this purpose. Values in a range of 3.5 kV provide optimal results.

This can also lead to an alternating arrangement of wires 25 or electrodes 18+ with a positive potential and wires 25 or electrodes 18− with a negative potential. The wires 25 and/or electrodes 18 can be supplied with electrical voltage via a device 26 providing electrical voltage. For this purpose, electrodes 18+, 18− are connected to the device 26 via suitable connecting devices 30 or 30+, 30−. The wires 25 applied with electrical voltage, are spaced so far apart from each other that a suitable permanent electrical field or a suitable cyclical increasing and decreasing electrical field 28 or a suitable electrical field with interruptions in time intervals can form. Besides the already described electrodes 18, where positive and negative electrical potentials are applied, in this context electrodes 18 are also suitable, where the electrical potential is generated by a positive potential and a grounding or by a negative potential and a grounding.

By supplying the electrodes 18+, 18− or individual wires 25 with electrical voltage and via the resulting positive or negative electrical potentials, an electrical field 28 can form. The electrical potential applied to the electrodes 18 and wires 25 can over time be approximately constant or intermittent or pulsating and/or increasing and decreasing, especially up swelling and down swelling. Insects 2 approaching the electrical field 28 are rejected and/or repelled by the electrical field 28 and/or prevented from passing through the opening 12 or, in this case, the open eave 13. Regarding this effect, reference is made to FIG. 1B. In order to reject and/or repel the undesirable insects 2, in particular mosquitoes, and/or to prevent the undesirable insects 2 from passing through the opening, an electrical field 28 with a value of less than or equal to or greater than 1 kV/cm is particularly suitable.

Figure 3:
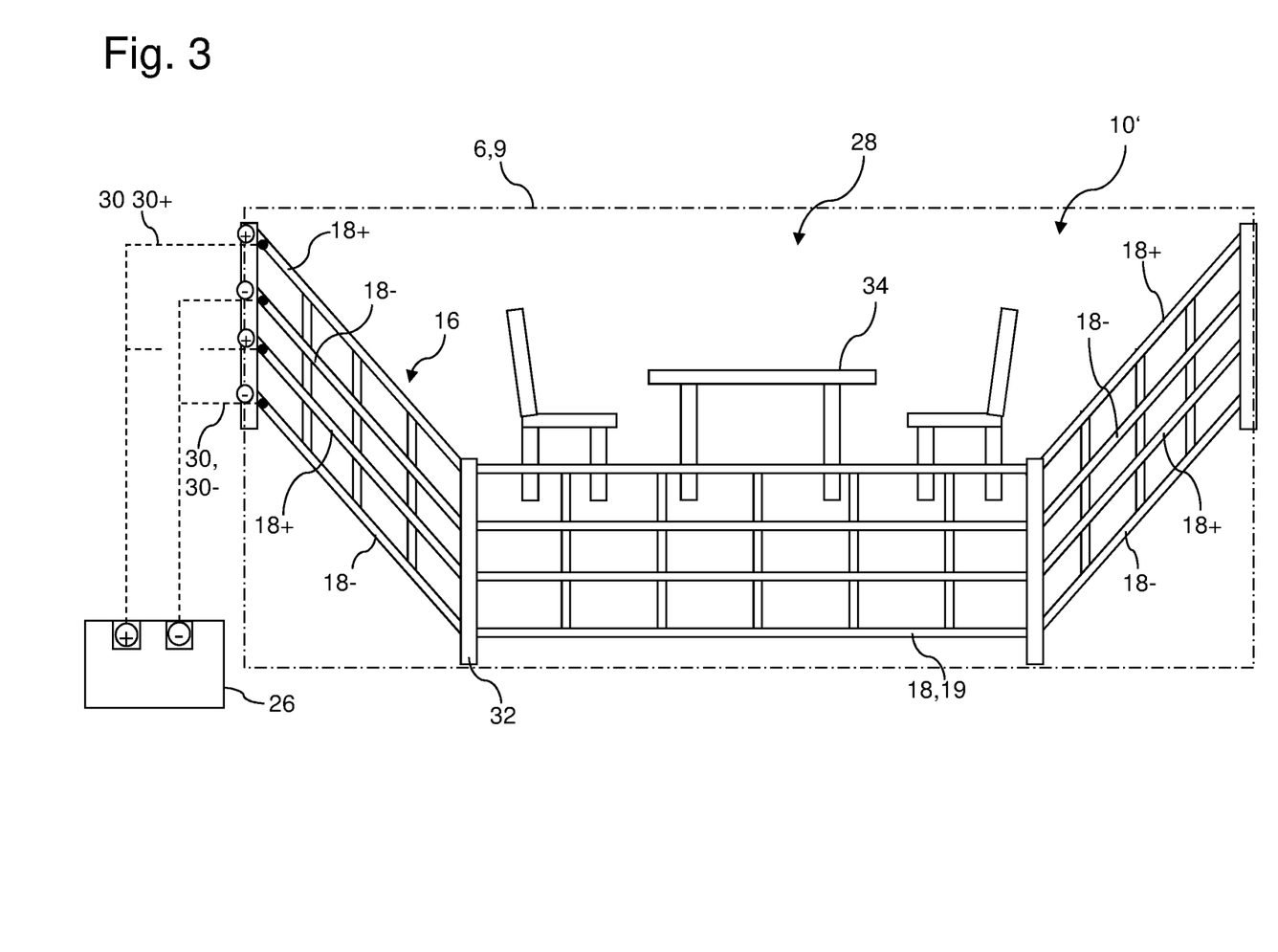
FIG. 3 shows a schematic representation of another embodiment of the insect repulsion and/or barrier arrangement according to the invention.

The schematic representation of the FIG. 3 shows another version of an insect repulsion and/or barrier arrangement 10' according to the invention. Hereby, the insect repulsion and/or barrier arrangement 10' is positioned within a defined surface 9 or an environment 6. The insect repulsion and/or barrier arrangement 10' comprises at least one framework 32 which at least partially spans over a surface 9 or an environment 6 and which is largely permeable to ambient air. The framework 32 is equipped with devices 16 to prevent the passage of insects 2 through the framework 32 and/or to repel insects when approaching the framework 32 and/or the devices 16. The devices 16 furthermore comprise at least two electrodes 18 whereby different electrical potentials are applied to or can be applied to the at least two electrodes 18.

The framework 32 can preferably be equipped and/or spanned with a large number of approximately equidistantly and parallel arranged elongated electrical conductors 19, the electrical conductors 19 each forming an electrode 18, whereby a similar and/or uniform and/or constant electrical field 28 can be formed between each pair of adjacent electrodes 18. Metallic or electrically conductive wires 25 with a small cross-section compared to their length are suitable for this purpose. The wires 25 or other elongated electrical conductors 19 can be arranged in a net-like or grid-like arrangement, for example with a distance of 1 cm to 3 cm, preferably 2 cm between each other.

The electrodes 18, which are arranged within and/or on the edge and/or outside of and in the proximity of framework 32 and in a definable distance from each other, can comprise at least two electrodes 18, whereby different electrical potentials are applied to or can be applied to the at least two electrodes 18 as already mentioned. As a result, a permanent electrical field 28 or a cyclically increasing and decreasing electrical field 28 can form between electrodes 18 or an electrical field 28 which is present at intervals of time with interruptions can be formed, whereby insects 2 approaching the electrical field 28 are rejected. In addition, the electrical field 28 can also prevent insects from passing through the surface 9 or environment 6 spanned or covered by the framework 32.

In FIG. 3 the aforementioned surrounding environment 6 or surface 9 is indicated as a dotted line field. By the insect repulsion and/or barrier arrangement 10' and the electrical field 28 generated by this, for example, a sitting area, sleeping area or working area 34 or the like can be shielded and/or protected, in which area 34 people often stay and from whose human smells or other attractants the insects 2 are attracted. The seating area, sleeping area or working area 34 can be protected from insects 2, such as flying insects and/or pest insects, in particular mosquitoes, sand flies, biting midges, black flies, other flies, etc. by the insect repulsion and/or barrier arrangement 10' in order to create an insect-free or mosquito-free zone for the persons staying within the area 34. The insect repulsion and/or barrier arrangement 10' can also be suitably be used, for example, for animal stables or the like, in order to create insect-free areas for the animals.

In order to generate the respective electrical field 28, the electrodes 18 and/or conductors 19 can be applied with an appropriate electrical voltage via suitable connector, so that a similar and/or uniform and/or constant electrical field 28 is formed between each pair of adjacent electrodes 18 and/or conductors 19. In this context, too, voltage values that provide an electrical potential on the electrodes 18 or conductors 19 in the range of at least 2 kV, particularly values providing an electrical potential in the range of more than 3 kV, especially values in a range of 3.5 kV.

A device 26 providing electrical voltage can be used to supply the conductors 19 and/or electrodes 18 with the required electrical voltage. For this purpose, the electrodes 18+, 18− can be connected via suitable connecting devices 30 or 30+/30− to the device 26 providing electrical voltage. On the basis of an alternating arrangement of conductors 19 and/or electrodes 18+ with positive potential as well as conductors 19 and/or electrodes 18− with negative potential, the electrical potential or the electrical field 28 can be formed. Alternatively, electrodes 18 are also suitable for producing an electrical field 28, where the electrical potential is generated by a positive potential and a grounding or by a negative potential and a grounding.

By supplying the electrodes 18+, 18− or individual conductors 19 with electrical voltage and the thereby resulting positive or negative electrical potentials the desired electrical field 28 can be formed or generated. In principle, the electrical potential applied to electrodes 18 and/or conductors 19 can over time also be approximately constant or intermittent or pulsating and/or swelling up and down. Thus, the electrical field 28 can reject insects 2 approaching the electrical field 28 and/or the electrical field 28 can prevent the passage of the insects through the environment 6 or surface 9 that is spanned or covered by the framework 32.

Figure 4:
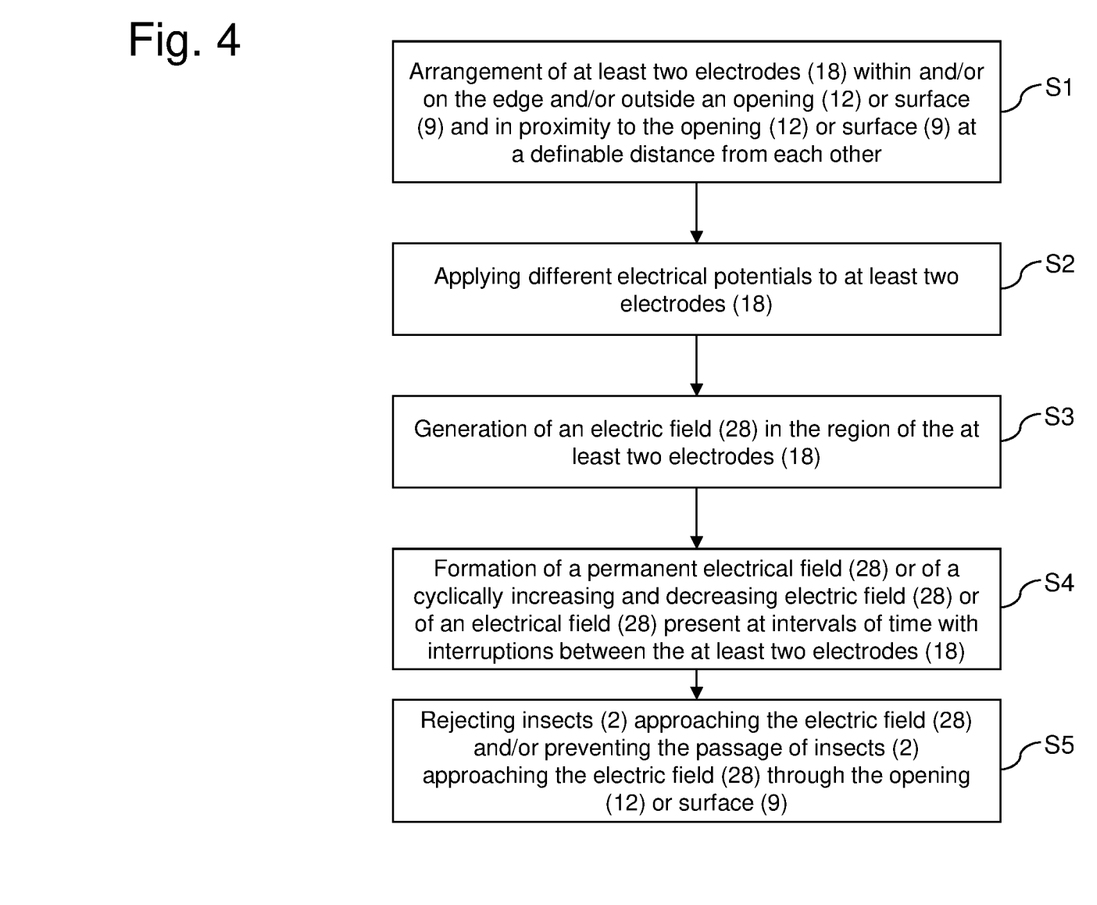
FIG. 4 shows a flowchart of a method according to the invention.

The FIG. 4 further shows some important steps of the inventive method for repelling insects 2 and/or preventing the passage of insects 2 through a defined opening 12 or surface 9. At first, at least two electrodes 18 are arranged within an opening 12 or surface 9 and/or on the edge of an opening 12 or surface 9 and/or outside and close to an opening 12 or surface 9 and in a definable distance from each other (step S1). Subsequently, different electrical potentials are applied to the at least two electrodes 18 (step S2), whereby an electrical field 28 can be generated in the range of the at least two electrodes 18 (step S3). In this way, an electrical field 28 can be formed between the at least two electrodes 18 (step S4) which is either permanent or cyclically increasing and decreasing or which is present at time intervals with interruptions. The electrical field 28 can be used to repel insects approaching the electrical field 28. In addition, it is also possible to prevent insects 2 approaching the electrical field 28 from passing through the opening 12 or surface 9 (step S5).

Figure 5:
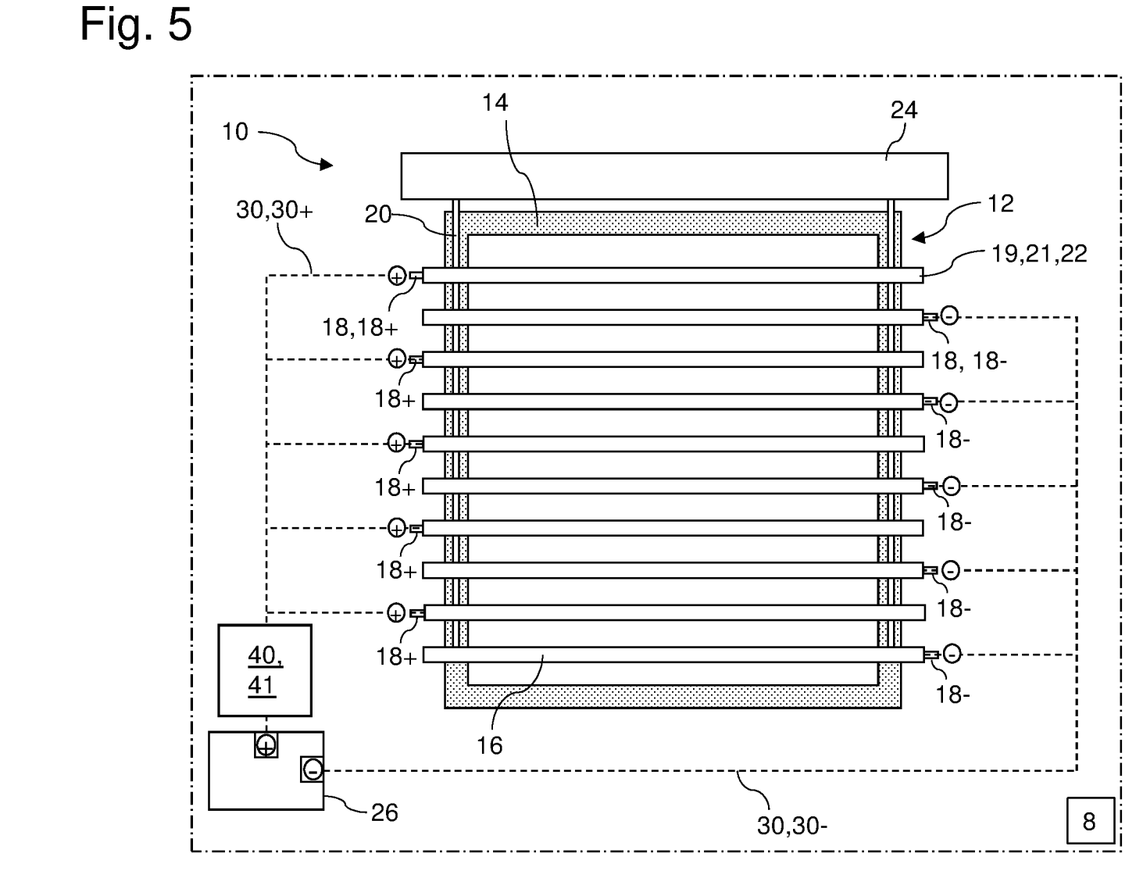
FIG. 5 shows a schematic representation of another embodiment of the insect repulsion and/or barrier arrangement according to the invention.

FIG. 5 shows a schematic representation of another embodiment of the insect repulsion and/or barrier arrangement 10 according to the invention. The insect repulsion and/or barrier arrangement 10 essentially corresponds to the embodiment depicted in FIG. 1A, to the description of which reference is hereby made.

Here the parallel electrical conductors, especially the electrodes 18+, 18−, are arranged at a distance of about 1 cm apart from each other and have a potential difference of 1 kV. Thereby an electric field 28 of 1 kV/cm is generated that repels more than 90% of approaching insects, especially mosquitoes.

To avoid damage to human body or damage to any other animal, mammal etc accidentally contacting the insect repulsion and/or barrier arrangement 10 with the highly charged electrodes 18+, 18−, the flow of the current should be limited. For this purpose, the insect repulsion and/or barrier arrangement 10 comprises an integrated contact protector or touch protection device 40. This touch protection device 40 comprises a large resistor 41 which has been connected in between the high voltage generator and all the conductors, especially all the electrodes 18+, 18− which are at high potential.

Now in case a person or animal touches the electrodes 18+, 18−, the flow of current through the body would be limited by the safety resistor 41. For example, if the voltage of an electrode 18+ is 4 kV and the value of the safety resistor is 1 megaohm then according to Ohm's law the current that will flow through body is reduced to 4 mA, which is hardly noticeable.

The safety resistor 41 is selected according to the voltage difference used between the electrodes 18+, 18−. If, for example, the applied voltage difference between the at least two electrodes 18+, 18− is more than 1 kV to produce an even stronger electric field 28, the respective value of the safety resistor 41 will change accordingly. Preferentially a resistor 41 equal or greater than 1 megaohms is used.

An insect repulsion and/or barrier arrangement 10 with such a touch protection device 40 can use very high electrical potentials applied to the at least two electrodes 18+, 18−. It is even possible to increase the distances between the at least two electrodes 18+, 18− without impairing the function of the insect repulsion and/or barrier arrangement 10 and still repelling insects approaching the electric field 28 and/or preventing the insects from passing through the opening 12.

The invention has been described with reference to preferred embodiments. To the expert it is also conceivable, however, to make changes and modifications without leaving the scope of protection of the appended claims.

LIST OF REFERENCE NUMBERS 2 insect, mosquito
4 residential building or stable building
6 environment
8 wall
9 surface
10 insect repulsion and/or barrier arrangement; barrier system
12 opening 13 open eave
14 room window
16 devices for preventing the passage of insects and/or for repulsion of insects approaching the opening and/or the devices
18 electrode
18+ electrode with positive potential
18− electrode with negative potential
19 elongated electrical conductor
20 blind
21 flat piece
22 lamellae
24 buffer for lamellae
25 wire
26 device providing electrical voltage
28 electrical field
30, 30+, 30− connecting device
32 framework
34 seating area, sleeping area or working area
40 touch protection device
41 Resistor

We claim:

1. A barrier system (10) comprising:
one or more devices (16), in the form of a blind (20) system, that comprise at least two electrodes (18), each with a different electrical potential, wherein the at least two electrodes (18) are arranged remotely from one another and such that the at least two electrodes form a permanent electrical field (28) or a cyclical electrical field (28) or an intermittent electrical field (28) within an opening (12),
wherein the at least two electrodes (18) are: a) within the opening (12) in a wall or surface, b) on the edge of the opening (12), or c) outside of the opening (12) and in proximity to the opening (12)
wherein the at least two electrodes are lamellae (22) of the blind (20), and
wherein the electrical field (28) is configured to prevent insects (2) from passing through the opening (12) or from being killed or injured.

2. The barrier system (10) of claim 1 further comprising at least one framework (32), wherein the framework (32) comprises the at least one opening (12), and the one or more devices (16) are located on the framework (32).

3. The barrier system (10) of claim 1, wherein the difference in electrical potential between the at least two electrodes (18) is of a magnitude of at least 2 kV.

4. The barrier system (10) claim 3, wherein the electrical potential between the at least two electrodes (18) is of a magnitude of 3 kV.

5. The barrier system (10) of claim 1, wherein the lamellae (22) comprise metallic or electrically conductive wires (25) with a small cross-section compared to their length or comprise metallic or electrically conductive flat pieces (21), with a small thickness compared to their length and with a width larger than the small thickness.

6. A method for repelling insects (2) or for preventing insects (2) from passing through an opening comprising:
with at least two electrodes (18) in the form of lamellae (22) of a blind (20) system, generating an electrical field (28) within the opening (12), by applying different electrical potentials to the electrodes (18), wherein the at least two electrodes (18) are arranged a distance from one another: a) within the opening (12), b) on the edge of the opening (12), or c) outside of the opening (12) and in proximity to the opening (12),
wherein a permanent electrical field (28) or a cyclically electrical field (28) or intermittent electrical field (28) is present within the opening (12) between the at least two electrodes (18), and
wherein the electrical field (28) is configured to prevents insects (2) approaching the electrical field (28) from passing through the opening (12) or from being killed or injured.

7. The barrier system (10) of claim 5, wherein the flat pieces (21) are arranged in such a way that their flat sides are facing each other.

8. The barrier system (10) of claim 1, wherein the at least two electrodes (18) form a uniform or constant electrical field (28).

9. The barrier system (10) of claim 6, wherein the at least two electrodes (18) form a uniform or constant electrical field (28).

10. The barrier system (10) of claim 1, wherein the electrical potential applied to the at least two electrodes (18) is formed by: (a) positive and negative voltages of at least one voltage source (26); (b) a positive potential and a grounding; or (c) a negative potential and a grounding.

11. The barrier system (10) of claim 1 further comprising a contact protection device (40) comprising at least one resistor (41), wherein the at least one resistor (41) is in the region of the at least two electrodes (18).

12. A method for repelling insects (2) or for preventing insects (2) from passing through an opening comprising:
with at least two electrodes (18) in the form of lamellae (22) of a blind (20), generating an electrical field (28) within an opening (12), by applying different electrical potentials to the electrodes (18), wherein the at least two electrodes (18) are arranged a distance from one another: a) within the opening (12), b) on the edge of the opening (12), or c) outside of the opening (12) and in proximity to the opening (12),
wherein a permanent electrical field (28) or a cyclically electrical field (28) or intermittent electrical field (28) is present within the opening (12) between the at least two electrodes (18), and
wherein the electrical field (28) is configured to prevents insects (2) approaching the electrical field (28) from passing through the opening (12) or from being killed or injured.

13. The barrier system (10) of claim 4 wherein the difference in electrical potential between the at least two electrodes (18) is of a magnitude of at least 3.5 kV.

14. The barrier system of claim 1, wherein the lamellae (22): (a) comprise an electrically conductive material; (b) consist of an electrically conductive material; or (c) comprise an electrically conductive coating; and
wherein the lamellae (22) are fixed, rotatable or otherwise adjustable or movable.

* * * * *